United States Patent
Hong et al.

(10) Patent No.: US 8,811,744 B2
(45) Date of Patent: Aug. 19, 2014

(54) METHOD FOR DETERMINING FRONTAL FACE POSE

(75) Inventors: Tae-Hwa Hong, Seoul (KR);
Young-Min Jeong, Suwon-si (KR);
Joo-Young Son, Gyeonggi-do (KR);
Chang-Han Kim, Seoul (KR);
Sung-Dae Cho, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 350 days.

(21) Appl. No.: 12/962,309

(22) Filed: Dec. 7, 2010

(65) Prior Publication Data
US 2011/0075933 A1    Mar. 31, 2011

(30) Foreign Application Priority Data
Dec. 7, 2009    (KR) .................... 10-2009-0120574

(51) Int. Cl.
*G06K 9/00* (2006.01)
*G06K 9/46* (2006.01)
*G06K 9/66* (2006.01)

(52) U.S. Cl.
USPC .................... 382/190; 382/118; 382/170

(58) Field of Classification Search
CPC .......... G06K 9/00221; G06K 9/00228; G06K 9/00241; G06K 9/00248; G06K 9/0268; G06K 9/00275
USPC .................... 382/115–118, 170, 181, 190
See application file for complete search history.

(56) References Cited

U.S. PATENT DOCUMENTS

| | | | |
|---|---|---|---|
| 6,707,933 | B1 | 3/2004 | Mariani et al. |
| 2005/0135679 | A1 | 6/2005 | Yoon et al. |
| 2008/0310720 | A1* | 12/2008 | Park et al. ............... 382/181 |
| 2009/0220156 | A1* | 9/2009 | Ito et al. ............... 382/201 |

FOREIGN PATENT DOCUMENTS

| | | |
|---|---|---|
| CN | 101593352 | 12/2009 |
| JP | 2004-094491 | 3/2004 |
| JP | 2009-211178 | 9/2009 |
| KR | 1020010108613 | 12/2001 |
| KR | 1020050060799 | 6/2005 |
| KR | 1020090065965 A | 6/2009 |

OTHER PUBLICATIONS

Ahonen et al., "Face Description with Local Binary Patterns: Application to Face Recognition", Dec. 2006, IEEE Transactions on Pattern Analysis and Machine Intelligence, vol. 28, iss. 12, p. 2037-2041.*

Chen et al., "Fully automated facial symmetry axis detection in frontal color images", Oct. 18, 2005, IEEE Workshop on Automatic Identification Advanced Technologies, 2005, p. 106-111.*

(Continued)

*Primary Examiner* — Shtephen R Koziol
*Assistant Examiner* — Timothy Choi
(74) *Attorney, Agent, or Firm* — The Farrell Law FIrm, P.C.

(57) ABSTRACT

A method for determining a frontal face pose by using the symmetry of a face including detecting a face region in an image, detecting an eye region in the detected face region, normalizing the face region, analyzing the symmetry in the normalized face region, and determining whether a face pose is a frontal face pose based on an analysis of the symmetry.

12 Claims, 9 Drawing Sheets

(56) References Cited

OTHER PUBLICATIONS

Yang et al., "Efficient Mean-Shift Tracking via a New Similarity Measure", Jun. 25, 2005, IEEE Computer Society Conference on Computer Vision and Pattern Recognition, 2005, vol. 1, p. 176-183.*
Rui et al., "Relevance feedback: a power tool for interactive content-based image retrieval", Sep. 1998, IEEE Transactions on Circuits and Systems for Video Technology, vol. 8, iss. 5, p. 644-655.*
Kotropoulos et al.: "Rule-Based Face Detection in Frontal Views", IEEE International Conference on Acoustics, Speech, and Signal Processing, Apr. 21, 1997.
Guo et al.: "A Fast Algorithm Face Detection and Head Pose Estimation for Driver Assistant System", The 8th International Conference on Signal Processing, Jan. 1, 2006.
Gao et al.: "Standardization of Face Image Sample Quality", Advances in Biometrics; Lecture Notes in Computer Science, Aug. 27, 2007.
Hu et al.: "Estimating Face Pose by Facial Asymmetry and Geometry", Sixth IEEE International Conference on Automatic Face and Gesture Recognition, Proceedings, May 17, 2004.
Timo Ojala et al., "Multiresolution Gray-Scale and Rotation Invariant Texture Classification with Local Binary Patterns".
IEEE Transactions on Pattern Analysis and Macine Intelligence, vol. 24, No. 7, Jul. 2002.

* cited by examiner

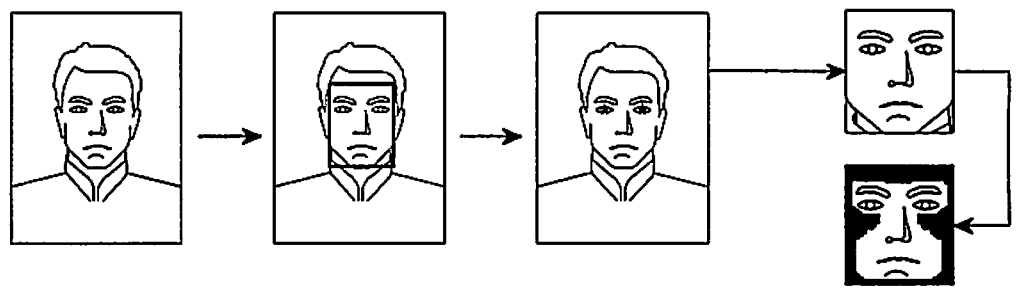

FIG.9A
FIG.9B
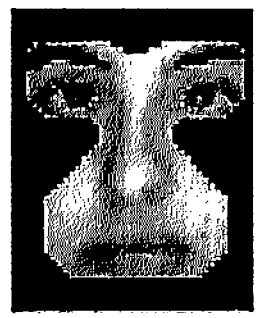
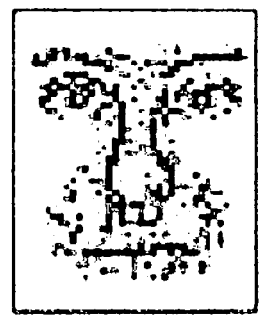
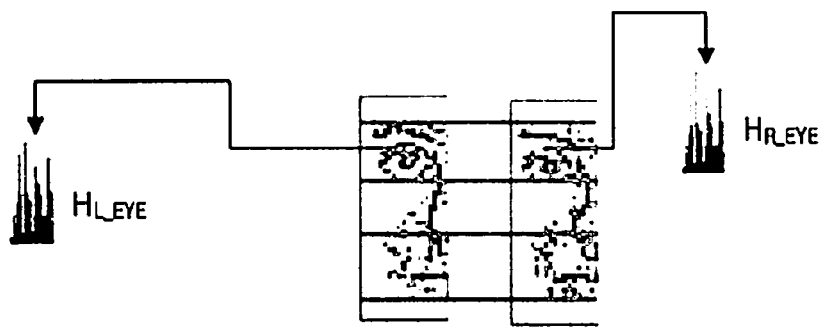
FIG.9C

METHOD FOR DETERMINING FRONTAL FACE POSE

PRIORITY

This application claims priority under 35 U.S.C.§119(a) to an application filed in the Korean Intellectual Property Office on Dec. 7, 2009 and assigned Serial No. 10-2009-120574, the entire disclosure of which is incorporated herein by reference.

BACKGROUND OF THE INVENTION

1. Field of the Invention

The present invention generally relates to a method for determining a frontal face pose, and more particularly, to a method for determining a frontal face pose by using the symmetry of a face.

2. Description of the Related Art

Generally, the physical quantification of a pose of a face requires knowledge of rotation information of three orientation axes—yaw, pitch, and roll. However, since image information which is input through a camera is projected onto a two-dimensional (2D) plane, the measurement of the axes is impossible in practice. As a result, research has been conducted on a scheme in which a shape of a face is modeled in a three-dimensional (3D) form like a cylinder, a relationship with an image-projected plane is calculated, and then a pose of a face is estimated. However, this scheme has to repetitively calculate a relational inverse matrix between a model and a projected plane, requiring a large amount of processing time and high complexity. Consequently, this scheme cannot be applied to a real-time application in an embedded environment since the performance of such a system has a tolerance error of 10 degrees with respect to a measured value.

Much research has been conducted on a method for detecting or tracking several feature points (e.g., eyes, a nose, a mouth, etc.) in a detected face and estimating a pose of the face by using geometric relationships (e.g., a distance, an angle, an area, etc.) among them ("the feature point tracking-based approach"). This approach is more advantageous than the cylinder model-based approach in terms of speed, but the geometric pose estimation method is meaningful only when each feature point has to be independently detected and the accuracy of the detected position has to be guaranteed, i.e., corrected, whereby the amount of computation is not small and the performance of the method may not be superior over the cylinder model-based approach.

The above-mentioned methods are used to estimate a pose of a face (i.e., yaw, pitch, or roll), and a method generally used for solving a problem of determining whether the pose is a frontal face pose is achieved mostly by learning. In other words, a possible range of the frontal face pose is defined, learning data corresponding to the frontal face pose and learning data corresponding to non-frontal face pose are collected in large amounts, and then a classifier which is capable of distinguishing the learning data to the maximum is designed through a learning method. To this end, pattern recognition methods such as a neural network or a Support Vector Machine (SVM) are often used.

However, conventional methods for analyzing a pose of a face require significant computation time. The model-based approach is difficult to apply to a single image and even for moving images, errors must be corrected regularly. For this reason, the model-based approach is not suitable for an embedded system requiring a real-time pose analyzing feature. The feature point tracking-based approach needs a basis of accurate detection of necessary feature points, and has a high error rate and difficulty in generating results in real time.

Conventional methods for analyzing a face by using its symmetry have been used to detect a region of a face in an image, but these methods have many problems in practice since they have restrictions on the face pose due to the symmetry of the face.

SUMMARY OF THE INVENTION

Accordingly, an aspect of the present invention is to provide a method for determining a frontal face pose by using the symmetry of a face.

According to an aspect of the present invention, there is provided a method for determining a frontal face pose. The method includes detecting a face region in an image, detecting an eye region in the detected face region, normalizing the face region, analyzing symmetry in the normalized face region, and determining whether a face pose is a frontal face pose based on the analysis of the symmetry.

BRIEF DESCRIPTION OF THE DRAWINGS

The above and other features and advantages of an embodiment of the present invention will be more apparent from the following detailed description taken in conjunction with the accompanying drawings, in which:

FIGS. 4 through 5B are views illustrating an eye region detecting process in FIG. 2;

FIGS. 7A through 7E are views illustrating a face-arranged image and a mask-applied image in FIG. 2;

FIGS. 9A through 9C are views illustrating a symmetry analyzing process in FIG. 1.

DETAILED DESCRIPTION OF THE EMBODIMENTS OF THE PRESENT INVENTION

An embodiment of the present invention will be described in detail with reference to the accompanying drawings. Throughout the accompanying drawings, identical symbols will refer to identical components.

Figure 1:
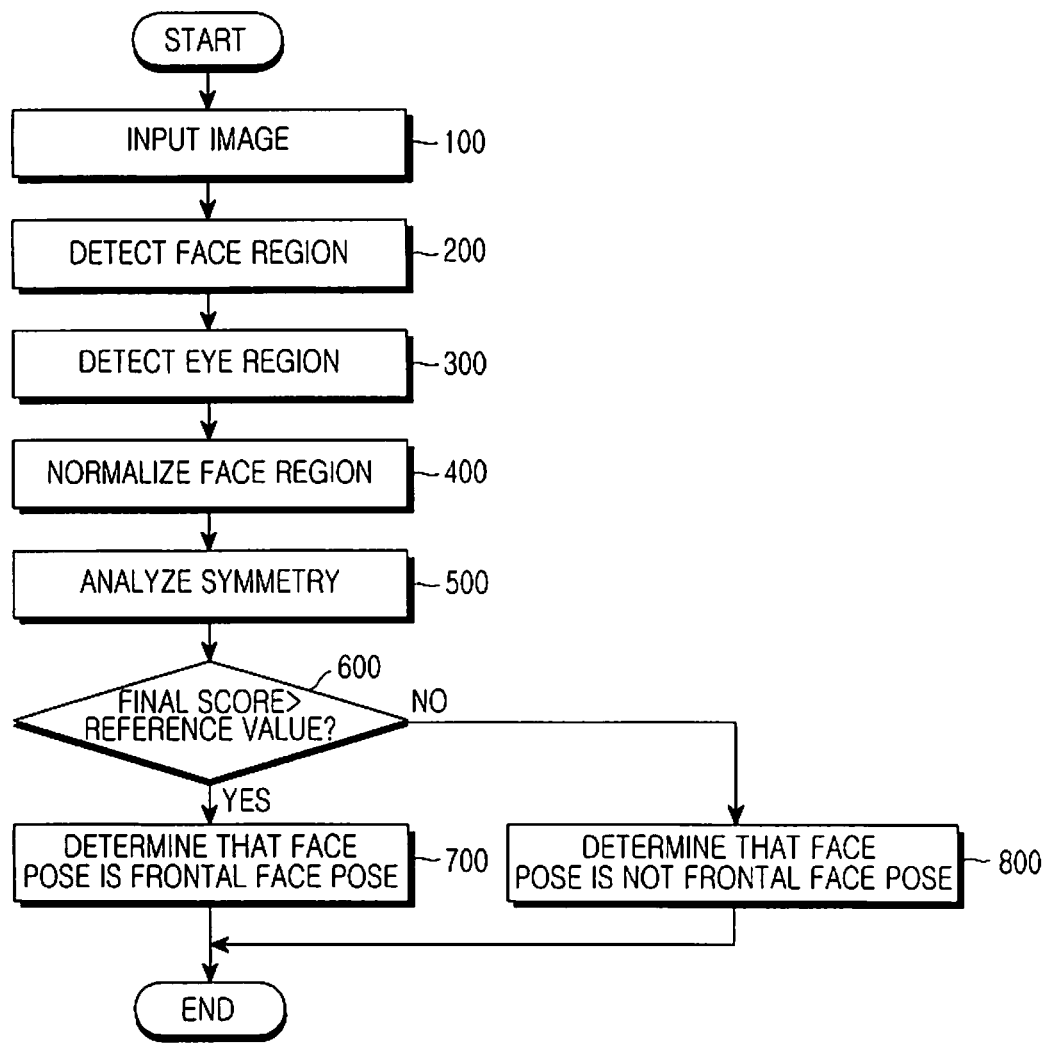
FIG. 1 is a flowchart illustrating a method for determining a frontal face pose according to an embodiment of the present invention.

FIG. 1 is a flowchart illustrating a method for determining a frontal face pose according to an embodiment of the present invention.

Referring to FIG. 1, if an image is input in a frontal face pose determination mode in step 100, a controller (not shown) detects the input of the image and detects a face region from the input image in step 200.

The controller forms a pyramid having N levels with the input image by using an Adaboost learning pattern-based window scan scheme and then scans a face window learned from each pyramid image to search for candidate images. Objects located in similar positions in the candidate images are then merged to determine and detect a face region.

Once the controller detects the face region in step 200, the controller detects an eye region from the detected face region in step 300.

Figure 4:
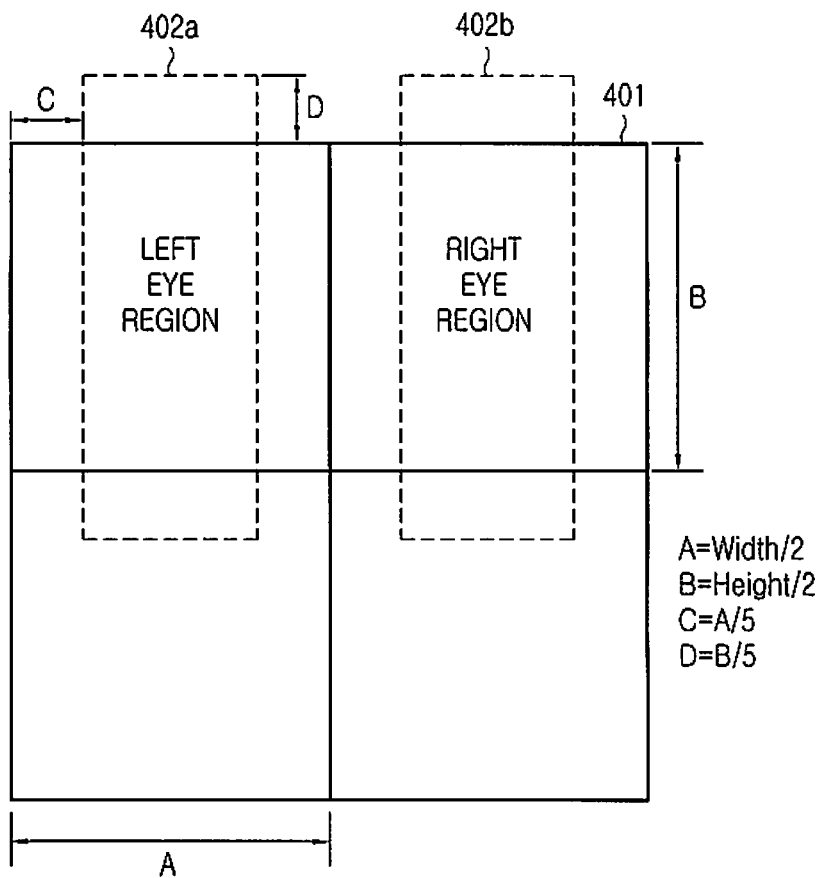

In step 300, the controller assigns a left-eye region 402a and a right-eye region 402b in a square face region 401 which includes the face region as shown in FIG. 4.

The left-eye region 402a and the right-eye region 402b are candidate regions for scanning the left eye and the right eye, and are intended to increase a probability of discovering an eye when a face pose (e.g., the roll angle) is rotated on the plane of the image.

Therefore, the controller analyzes an edge direction around an eye in the face region which changes according to a face pose, to detect a rotation direction of a roll angle (clockwise or counter-clockwise direction), and adjusts the left-eye region 402a or the right-eye region 402b according to the detected rotation direction of the roll angle. An adjustment value for the left-eye region 402a or the right-eye region 402b, according to the rotation direction of the roll angle, is previously stored in a memory.

Figure 5:
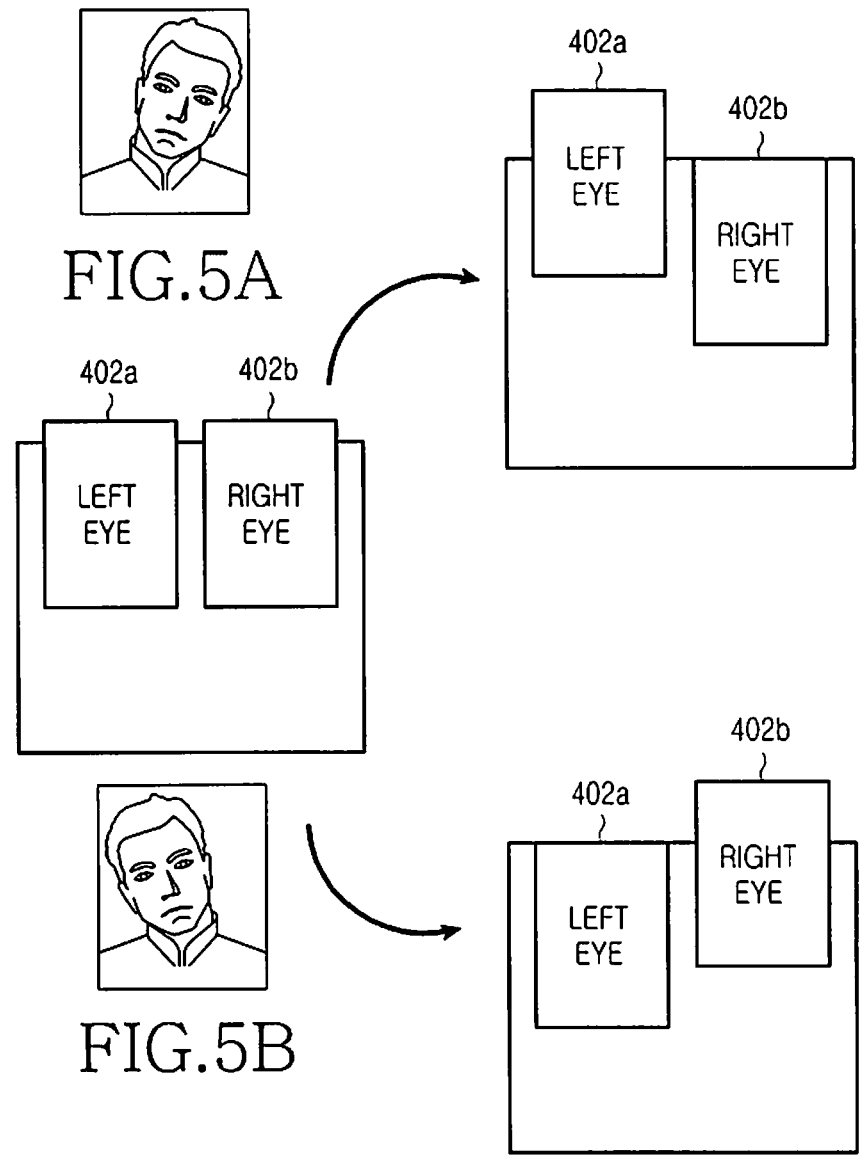

FIGS. 5A and 5B are views illustrating adjustment of the left-eye region 402a or the right-eye region 402b according to a rotation direction of the roll angle.

When a face pose is tilted in the clockwise direction, as shown in FIG. 5A, the controller detects a rotation direction of a roll angle by analyzing an edge direction around an eye in a face region and adjusts the left-eye region 402a upward according to the detected rotation direction of the roll angle.

When the face pose is tilted in the counter-clockwise direction, as shown in FIG. 5B, the controller detects a rotation direction of a roll angle by analyzing an edge direction around an eye in the face region and adjusts the right-eye region 402b upward according to the detected rotation direction of the roll angle.

After the eye is detected by adjusting the left-eye region 402a or the right-eye region 402b according to the rotation direction of the roll angle in step 300, the controller normalizes the detected face region in step 400.

The face normalizing process of step 400 will be described in detail with reference to FIG. 2.

Figure 2:
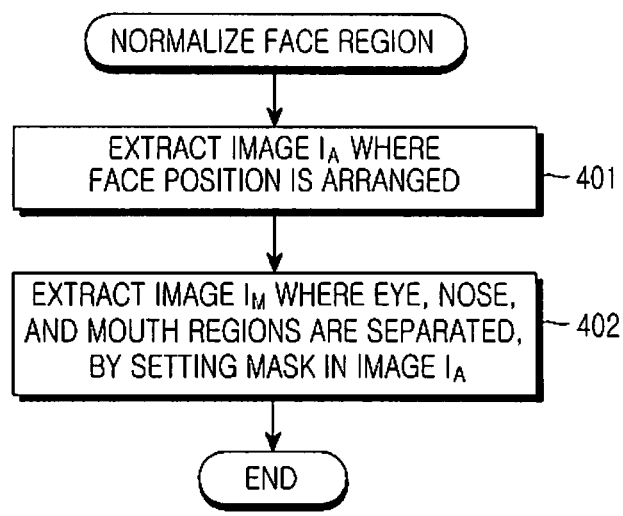
FIG. 2 is a flowchart illustrating a face normalizing process in FIG. 1.

Referring to FIG. 2, the controller arranges a position of a face in the detected face region in step 401.

In step 401, the controller moves a position of an eye in the detected eye region to a fixed eye position of a preset image, thus, extracting a face-arranged image $I_A$.

For example, if a resolution of the preset image is 50 by 40 and positions of eyes in the preset image are (15, 30) and (15, 30), respectively, the controller moves the positions of the eyes to (15, 30) and (15, 30) in the detected eye region.

After moving the positions of the eyes in the detected eye region to the fixed eye positions of the preset image, the controller calculates an Affine transformation matrix for empty pixels in the original eye positions in the face region and fills the empty pixels based on the calculated transformation matrix.

After extracting the face-arranged image $I_A$ in step 401, the controller sets a mask for the image $I_A$ for filtering, thus, extracting an image $I_M$ where an eye region, a nose region, and a mouth region are separated in step 402.

Figure 6:
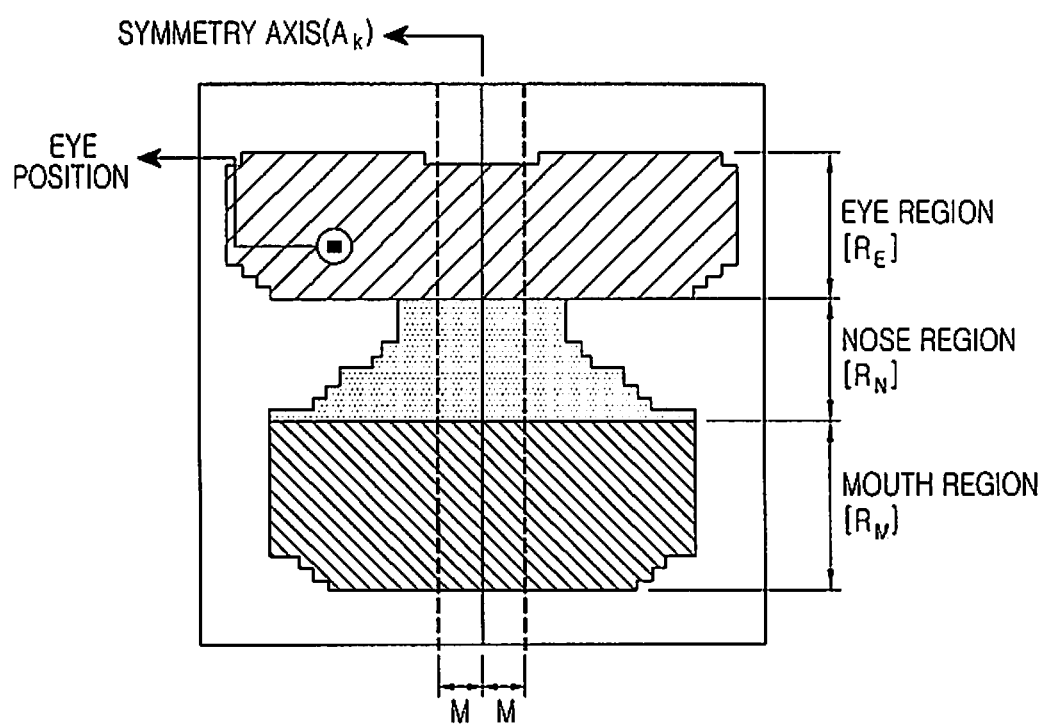
FIG. 6 is a view illustrating a mask-applied image in FIG. 2.

As shown in FIG. 6, the mask-set image $I_M$ is such that an eye region $R_E$, a nose region $R_N$, and a mouth region $R_M$ are separated to be given weight values during a symmetry analysis, and a virtual symmetry axis $A_k$ which is perpendicular to the x axis may be set.

FIG. 7A illustrates the input image in step 100 of FIG. 1, FIG. 7B illustrates the face region detected in step 200 of FIG. 1, FIG. 7C illustrates the eye region detected in step 300 of FIG. 1, FIG. 7D illustrates the face-arranged image $I_A$ in step 401 of FIG. 2, and FIG. 7E illustrates the mask-set image $I_M$ in step 402 of FIG. 2.

Once the controller extracts the mask-set and filtered image $I_M$ in step 402, the controller analyzes its symmetry in step 500.

The symmetry analyzing process of step 500 will be described in detail with reference to FIG. 3.

Figure 3:
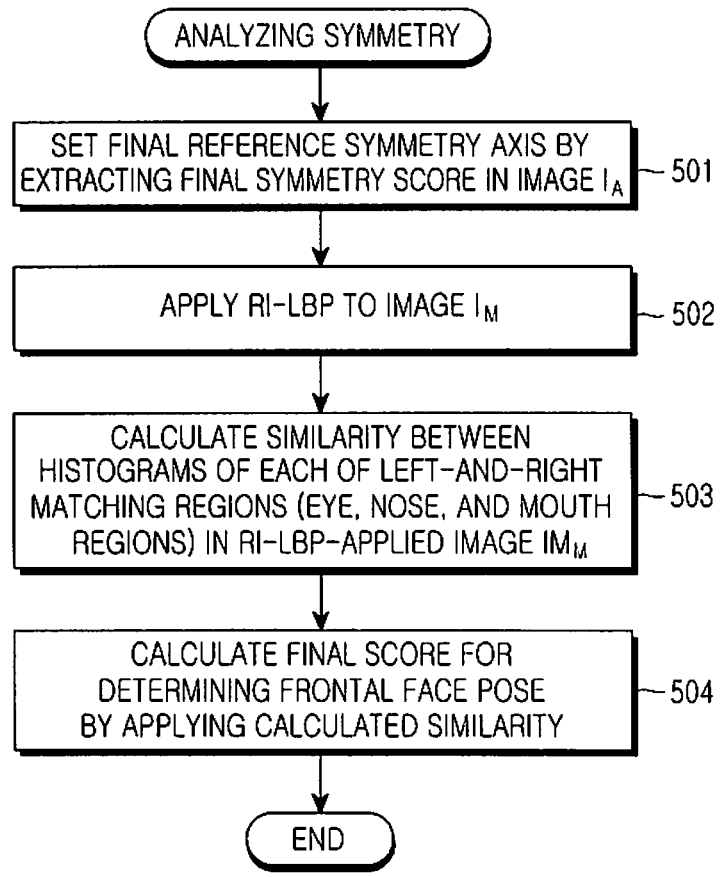
FIG. 3 is a flowchart illustrating a symmetry analyzing process in FIG. 1.

Referring to FIG. 3, the controller sets a final reference symmetry axis in which bisymmetry is corrected in the image $I_M$ in step 501.

Step 501 is intended to partially correct inaccuracy of the eye-detecting process, and the controller compares symmetric features of a left region and a right region by leaving a margin M having particular pixels to the left and to the right with respect to the reference symmetry axis $A_k$ in the image $I_M$, as shown in FIG. 6.

The controller calculates a symmetry score based on the comparison between the symmetric features of the left region and the right region while moving the reference symmetry axis $A_k$ within the margin M, and then defines a symmetry score in a symmetry axis in which the symmetry score is smallest as a final symmetry score of the image $I_M$. This process can be expressed as below.

$$C_j = \arg_{min S_k} S_k, \quad (1)$$

$$A_R - M \leq k \leq A_R + M,$$

wherein $S_k$ indicates a symmetry score, $A_R$ indicates a reference symmetry axis perpendicular to the x axis, M indicates a margin having predetermined pixels to the left and to the right with respect to the reference symmetry axis $A_R$, and k indicates a moving symmetry axis which moves within the margin M.

In Equation (1), a symmetry score $C_j$ of a $j^{th}$ face is defined as a minimum value among symmetry scores $S_k$ for respective axes when the moving symmetry axis k has a range according to definitions of the reference symmetry axis $A_R$ and the margin M.

Once the controller sets the final reference symmetry axis for the image $I_M$ in step 501, the controller applies a Rotation invariant-Local Binary Pattern (Ri-LBP) to image $I_M$ to analyze the symmetry of image $I_M$ in step 502.

Figure 8A:
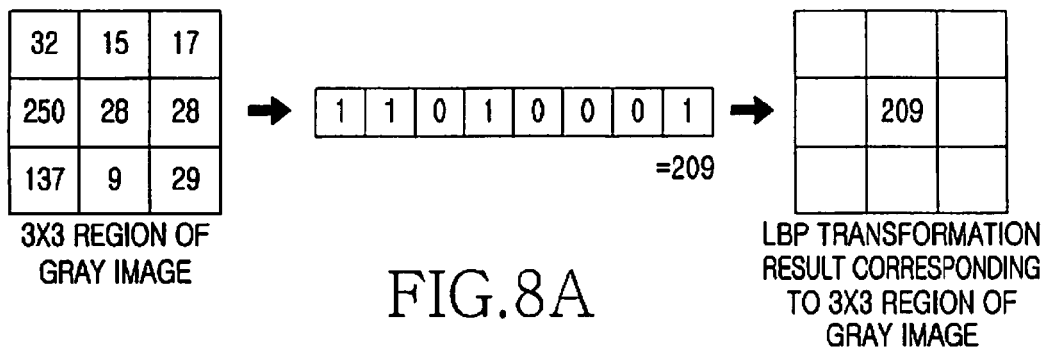
FIGS. 8A through 8C are views illustrating a Rotation-invariant Local Binary Pattern (Ri-LBP)
Figure 8B:
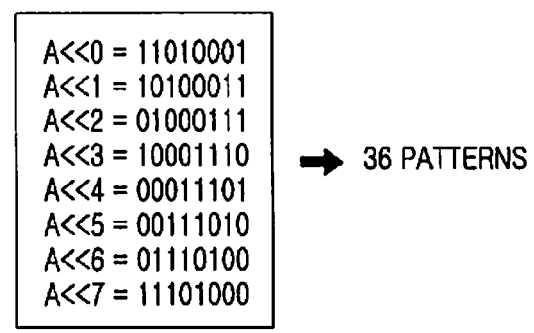
Figure 8C:
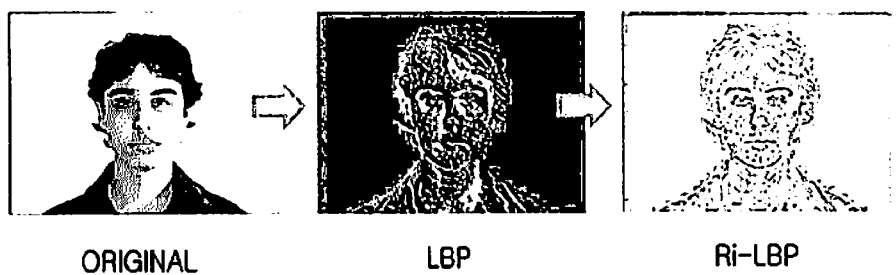

FIGS. 8A through 8C are views illustrating the Ri-LBP.

Referring to FIGS. 8A through 8C, the Local Binary Pattern (LBP) is selected by comparing the size of a center pixel in a 3×3 mask with the size of each neighbor pixel around the center pixel. If a specific direction is set for 8 neighboring pixels, a '1' is assigned for a neighbor pixel having a larger size than the center pixel and '0' is assigned for a neighbor pixel having a smaller or equal size than the center pixel, thus, determining and assigning an 8-bit value to the center pixel. In FIG. 8A, 256 (0 through $2^8-1$) patterns are generated and these patterns are less influenced by illumination.

When patterns made by bit shifts in a single pattern are grouped in the same category, this group is called a Ri-LBP. If 8 bit shifts are performed in a pattern extracted as shown in FIG. 8A bit-by-bit, 8 patterns are acquired and grouped as the same pattern, thus, reducing the 256 patterns generated using the LBP to 36 patterns as shown in FIG. 8B. FIG. 8C illustrates an image generated by applying an LBP to the original image and an image generated by applying a Ri-LBP to the original image.

After the Ri-LBP is applied to the image $I_M$ in step 502, the controller calculates a similarity between histograms of each of the eye region, the nose region, and the mouth region which are left-and-right matching regions in the Ri-LBP-applied image $I_M$ in step 503.

To calculate the similarity between the histograms, the controller uses a Bhattacharyya distance expressed in Equation (2) below.

$$BCH_{eye} = \sum_{i=1}^{n} \sqrt{H^i_{L\_Eye}} \sqrt{H^i_{R\_Eye}} \qquad (2)$$

$$BCH_{nose} = \sum_{i=1}^{n} \sqrt{H^i_{L\_Nose}} \sqrt{H^i_{R\_Nose}}$$

$$BCH_{mouth} = \sum_{i=1}^{n} \sqrt{H^i_{L\_Mouth}} \sqrt{H^i_{R\_Mouth}},$$

wherein $H_L^i$ indicates a Ri-LBP histogram of a left region (eye, nose, or mouth), and $H_R^i$ indicates a Ri-LBP histogram of a right region (eye, nose, or mouth).

FIGS. 9A through 9C are views illustrating a symmetry analyzing process in FIG. 1. FIG. 9A illustrates the mask-set image $I_M$, FIG. 9B illustrates an image generated by applying a Ri-LBP to the image shown in FIG. 9A, and FIG. 9C illustrates a Ri-LBP histogram of each of the left region (eye) and the right region (eye) with respect to the final reference symmetry axis set in step 501 of FIG. 3.

Once the controller calculates a similarity between histograms of each of the eye region, the nose region, and the mouth region, which are left-and-right matching regions, by using Equation (2) in step 503, the controller applies the calculated similarity to Equation (3) to calculate a final score for determining a frontal face pose in step 504.

$$\text{Score} = \sum_{i=1}^{3} BCH_i * w_i, \qquad (3)$$

wherein i=1 indicates the eye region, i=2 indicates the nose region, i=3 indicates the mouth region, and W indicates a weight wherein $W_1+W_2+W_3=1$ and $W_2>W_3>W_1$.

After the controller calculates the final score for determining the frontal face pose in step 504, the controller uses the calculation to compare the final score with a preset reference value in step 600 of FIG. 1. If the final score is larger than the preset reference value, the controller, in step 700, determines that a face pose in the image input in step 100 is a frontal face pose. If the final score is less than the preset reference value, the controller, in step 800, determines that the face pose in the image input in step 100 is not the frontal face pose.

As can be appreciated from the description above, a method for determining a frontal face pose according to the present invention can be used in various applications, and a photographer can take a picture of a frontal face, which contains the most information of an object. For babies or children who generally lack the concentration necessary to sit still for a picture, a picture of a good pose can be automatically taken by detecting a frontal pose. Moreover, face recognition often fails due to variations in pose rather than in the person's face itself when faces are registered or recognized. Therefore, determination of a frontal face pose can reduce the rate of failure.

While the present invention has been shown and described with reference to an embodiment thereof, it will be understood by those skilled in the art that various changes in form and details may be made therein without departing from the spirit and scope of the invention as defined by the appended claims. Therefore, the scope of the present invention should be defined by the appended claims and equivalents thereof, rather than the disclosed embodiment.

What is claimed is:

1. A method for determining a frontal face pose, the method comprising:
   detecting a face region in an image;
   detecting an eye region after adjusting position of the eye region according to a rotation direction of a roll angle detected by analyzing an edge direction around an eye in the detected face region;
   normalizing the face region;
   analyzing a symmetry in the normalized face region by setting a final reference symmetry axis by extracting a final symmetry score in which bisymmetry is corrected in an image $I_M$ extracted from the normalized face region; and
   determining whether a face pose is a frontal face pose based on the analysis of symmetry.

2. The method of claim 1, wherein the face region is detected by using an Adaboost learning pattern-based window scan scheme.

3. The method of claim 1, wherein detecting of the eye region comprises:
   assigning a left eye region and a right eye region to a square face region comprising the face region; and
   adjusting the left eye region and the right eye region according to a rotation direction of a roll angle detected based on the face pose.

4. The method of claim 1, wherein normalizing of the face region comprises:
   extracting an image $I_A$ where a face position is arranged by moving eye positions in the detected eye region to fixed eye positions of a preset image; and
   extracting an image $I_M$ where the eye region, a nose region, and a mouth region are separated by setting a mask in the image $I_A$.

5. The method of claim 4, further comprising:
   after moving eye positions in the detected eye region to fixed eye positions in the preset image, filling empty pixels in the original eye positions in the face region by calculating an Affine transformation matrix for the empty pixels.

6. The method of claim 4, wherein the analyzing of symmetry further comprises:
   applying a Rotation-invariant Local Binary Pattern (Ri-LBP) to the image $I_M$ where the final reference symmetry axis is set;
   calculating a similarity between histograms of each of left-and-right matching regions in the Ri-LBP-applied image $I_M$; and
   calculating a final score for determining a frontal face pose by using the calculated similarity.

7. The method of claim 1, wherein the final symmetry score is extracted by using:

$$C_j = \arg_{mimS_k} S_k,$$

$$A_R - M \le k \le A_R + M,$$

wherein $S_k$ indicates a symmetry score, $A_R$ indicates a reference symmetry axis perpendicular to the x axis, M indicates a margin having predetermined pixels to the left and to the right with respect to the reference symmetry axis $A_R$, and k indicates a moving symmetry axis which moves within the margin M.

8. The method of claim 7, wherein the final symmetry score is a minimum value among symmetry scores $S_k$ for the moving symmetry axis k which moves within the margin M.

9. The method of claim 6, wherein the left-and-right matching regions comprise one of the eye region, a nose region, and a mouth region.

10. The method of claim 6, wherein the similarity between the histograms of the left-and-right matching regions is calculated by using:

$$BCH_{eye} = \sum_{i=1}^{n} \sqrt{H^i_{L\_Eye}} \sqrt{H^i_{R\_Eye}}$$

$$BCH_{nose} = \sum_{i=1}^{n} \sqrt{H^i_{L\_Nose}} \sqrt{H^i_{R\_Nose}}$$

$$BCH_{mouth} = \sum_{i=1}^{n} \sqrt{H^i_{L\_Mouth}} \sqrt{H^i_{R\_Mouth}},$$

wherein $H_L^i$ indicates a Ri-LBP histogram of a left region of an eye, a nose, or a mouth, and $H_R^i$ indicates a Ri-LBP histogram of a right region of an eye, a nose, or a mouth, and wherein i is a variable for indexing entries and n is a total number of entries in the histograms of each of left-and-right matching regions.

11. The method of claim 6, wherein the final score is calculated by using:

$$Score = \sum_{i=1}^{3} BCH_i * w_i$$

wherein i=1 indicates the eye region, i=2 indicates the nose region, i=3 indicates the mouth region, and W indicates a weight wherein $W_1+W_2+W_3=1$ and $W_2>W_3>W_1$.

12. The method of claim 1, wherein determining of whether a face pose is a frontal face pose comprises:
comparing the final score extracted by the analysis of symmetry with a preset reference value; and
determining that the face pose is the frontal face pose if the final score is greater than the preset reference value.

* * * * *